United States Patent
Tashiro et al.

(10) Patent No.: US 11,529,915 B2
(45) Date of Patent: Dec. 20, 2022

(54) ELECTRICAL CONNECTION BOX AND WIRE HARNESS

(71) Applicant: Yazaki Corporation, Tokyo (JP)

(72) Inventors: Hiroki Tashiro, Shizuoka (JP); Ryouichi Yokoyama, Shizuoka (JP); Takuma Kaneko, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 253 days.

(21) Appl. No.: 17/133,637

(22) Filed: Dec. 24, 2020

(65) Prior Publication Data
US 2021/0206333 A1 Jul. 8, 2021

(30) Foreign Application Priority Data
Jan. 7, 2020 (JP) .............................. JP2020-000918

(51) Int. Cl.
*B60R 16/02* (2006.01)
*B60R 16/023* (2006.01)
*H01H 85/20* (2006.01)
*H02G 3/16* (2006.01)

(52) U.S. Cl.
CPC ...... *B60R 16/0238* (2013.01); *B60R 16/0207* (2013.01); *H01H 85/20* (2013.01); *H02G 3/16* (2013.01); *H01H 2085/208* (2013.01); *H01R 2201/26* (2013.01)

(58) Field of Classification Search
CPC .. B60R 16/0238; B60R 16/0207; H01H 85/70
USPC .......................................................... 439/76
See application file for complete search history.

(56) References Cited

U.S. PATENT DOCUMENTS

| | | | | |
|---|---|---|---|---|
| 8,872,025 | B2 * | 10/2014 | Tamai | B62D 5/0406 361/728 |
| 8,927,858 | B2 * | 1/2015 | Sato | H02G 3/08 174/72 A |
| 9,226,423 | B2 * | 12/2015 | Sato | B60R 16/0239 |
| 9,502,872 | B2 * | 11/2016 | Shiraki | B60R 16/0238 |
| 9,564,742 | B2 * | 2/2017 | Nakashima | H02B 1/202 |
| 2007/0249189 | A1 * | 10/2007 | Kaneko | H05K 7/026 439/76.2 |

(Continued)

FOREIGN PATENT DOCUMENTS

CN 102377140 A 3/2012
EP 2410624 A2 1/2012

(Continued)

*Primary Examiner* — Alexander Gilman
(74) *Attorney, Agent, or Firm* — Kenealy Vaidya LLP

(57) ABSTRACT

A housing is provided with an electrical wire drawing path projecting toward outside and causing a plurality of at least one of an electrical wire bundle and the electrical wire to be drawn from inside to outside. The electrical wire drawing path includes a first wall member including two side portions extending in a projecting direction of the electrical wire drawing path, a second wall member disposed to be opposed to the first wall member with an interval, a first side wall member projecting from one side portion in a direction crossing an extending direction of the side portions and toward the second wall member, and a second side wall member projecting from the other side portion in a direction crossing an extending direction of the side portions and toward the second wall member.

8 Claims, 9 Drawing Sheets

(56) References Cited

U.S. PATENT DOCUMENTS

| | | | |
|---|---|---|---|
| 2010/0270075 A1* | 10/2010 | Murayama | H02G 3/0475 174/136 |
| 2010/0326690 A1* | 12/2010 | Ejima | B60R 16/0238 174/50 |
| 2010/0326691 A1* | 12/2010 | Ejima | B60R 16/0238 174/50 |
| 2011/0306221 A1 | 12/2011 | Kamo | |
| 2012/0018185 A1* | 1/2012 | Sato | H02G 3/08 174/50 |
| 2012/0073852 A1 | 3/2012 | Makino et al. | |
| 2015/0357799 A1 | 12/2015 | Nakashima | |
| 2017/0066113 A1* | 3/2017 | Kawada | H01H 85/0208 |
| 2017/0085067 A1* | 3/2017 | Sugimoto | H01R 13/5812 |
| 2017/0256893 A1* | 9/2017 | Kato | H01R 13/6593 |
| 2017/0327061 A1* | 11/2017 | Sone | B60R 16/0207 |
| 2018/0263128 A1* | 9/2018 | Nakano | H02G 3/081 |
| 2019/0115703 A1* | 4/2019 | Kawaguchi | H01R 13/6461 |
| 2019/0168697 A1* | 6/2019 | Washihira | H01R 13/74 |
| 2019/0344730 A1* | 11/2019 | Kakimi | H05K 5/0013 |
| 2020/0070747 A1* | 3/2020 | Yamaguchi | H01F 17/062 |
| 2020/0176894 A1* | 6/2020 | Tomita | B60R 16/0239 |
| 2020/0176967 A1* | 6/2020 | Tomosada | B60R 16/0207 |
| 2021/0206333 A1* | 7/2021 | Tashiro | B60R 16/0238 |
| 2021/0210301 A1* | 7/2021 | Tashiro | B60R 16/0238 |
| 2021/0273376 A1* | 9/2021 | Shinmi | H01R 13/71 |
| 2021/0273432 A1* | 9/2021 | Nishimura | H01B 7/00 |

FOREIGN PATENT DOCUMENTS

| | | |
|---|---|---|
| JP | 2001-128407 A | 5/2001 |
| JP | 2002-305823 A | 10/2002 |
| JP | 2012-5162 A | 1/2012 |
| JP | 2012-29431 A | 2/2012 |
| JP | 2015-180168 A | 10/2015 |
| WO | 2015/037699 A1 | 3/2015 |

* cited by examiner

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2020-000918 filed in Japan on Jan. 7, 2020.

BACKGROUND OF THE INVENTION

1. Field of the Invention

The present invention relates to an electrical connection box and a wire harness.

2. Description of the Related Art

In an electrical connection box, electronic components (such as circuit protection components, such as a fuse and a fusible link, and a relay) are stored in a housing, and the electronic components are electrically connected with other electronic components and/or electrical wires via a relay busbar in the housing. An electrical connection box of this type is disclosed in, for example, Japanese Patent Application Laid-open No. 2012-005162. In such an electrical connection box, the electrical wires are drawn from inside to outside the housing and electrically connected with a power source and/or a load or the like outside the housing. For this reason, the housing is provided with a passage (electrical wire drawing path) projecting from the inside toward the outside of the housing to draw the electrical wires from the inside to the outside.

In an electrical connection box, types and/or the number of electronic components and/or electrical wires stored in a housing may vary depending on, for example, differences in specifications of the vehicle on which the electrical connection box is mounted. For example, in some vehicles, a plurality of electrical wires and/or a plurality of electrical wire bundles are routed in the electrical wire drawing path, the electrical wires and/or the electrical wire bundles having a diameter equal to or smaller than a standard diameter (a diameter of the electrical wires and/or the electrical wire bundles determined as the routing subject in the electrical wire drawing path) of a standard electrical wire and/or a standard electrical wire bundle in the electrical wire drawing path, and being able to limit the gap in the electrical wire drawing path to a gap of a predetermined size (standard gap). By contrast, in another vehicle, a plurality of electrical wires and/or a plurality of electrical wire bundles routed in the electrical wire drawing path may include thick electrical wires and/or thick electrical wire bundles the diameter of which exceeds the standard diameter. As described above, in a conventional electrical connection box, there are cases where using a common housing among vehicles having different specifications is difficult. In addition, in another vehicle different from the vehicles described above, a plurality of electrical wires and/or a plurality of electrical wire bundles routed in the electrical wire drawing path may include electrical wires and/or electrical wire bundles thinner than those having the standard diameter, possibly creating a gap larger than the standard gap in the electrical wire drawing path. In this vehicle, it is possible to use the same housing as the housing in a vehicle in which the gap of the electrical wire drawing path is the standard gap, but a measure is required to suppress entering of water through the large gap in the electrical wire drawing path, which may reduce the effect produced by using a common housing.

SUMMARY OF THE INVENTION

For this reason, an object of the present invention is to provide an electrical connection box and a wire harness that can use a common housing for various electrical wires and/or electrical wire bundles.

In order to achieve the above object, an electrical connection box according to one aspect of the present invention includes: an electronic component with which an electrical wire is electrically connected; and an insulating housing storing therein the electronic component and in which at least one of an electrical wire bundle and the electrical wire is routed therein, the electrical wire bundle being formed by bundling a plurality of the electrical wires, wherein the housing is provided with an electrical wire drawing path projecting toward outside and causing a plurality of at least one of the electrical wire bundle and the electrical wire to be drawn from inside to outside, the electrical wire drawing path includes a first wall member including two side portions extending in a projecting direction of the electrical wire drawing path, a second wall member disposed to be opposed to the first wall member with an interval, a first side wall member projecting from one side portion of the side portions of the first wall member in a direction crossing an extending direction of the side portion and toward the second wall member, and a second side wall member projecting from the other side portion of the side portions of the first wall member in a direction crossing an extending direction of the side portion and toward the second wall member, and at least one of the first side wall member and the second side wall member is formed as an elastically deformable member enabling change of volume of an electrical wire routing space surrounded by the first wall member, the second wall member, the first side wall member, and the second side wall member.

According to another aspect of the present invention, in the electrical connection box, it is preferable that a boundary portion between the one side portion of the first wall member and the first side wall member is provided with an elastically deformable portion enabling tilt of the first side wall member with respect to the first wall member.

According to still another aspect of the present invention, in the electrical connection box, it is preferable that a boundary portion between the other side portion of the first wall member and the second side wall member is provided with an elastically deformable portion enabling tilt of the second side wall member with respect to the first wall member.

According to still another aspect of the present invention, in the electrical connection box, it is preferable that an end portion of the electrical wire drawing path on a projecting direction side is provided with an electrical wire drawing port causing a plurality of at least one of the electrical wire bundle and the electrical wire in the electrical wire routing space to be drawn to the outside, and the electrical wire drawing path is formed such that an interval between an end portion of the first side wall member in a projecting direction thereof and an end portion of the second side wall member in a projecting direction thereof is smaller than an interval between the two side portions of the first wall member, at the electrical wire drawing port.

A wire harness according to still another aspect of the present invention includes: an electrical wire; an electronic component with which an the electrical wire is electrically connected; and an insulating housing storing therein the electronic component and in which at least one of an electrical wire bundle and the electrical wire is routed therein, the electrical wire bundle being formed by bundling a plurality of the electrical wires, wherein the housing is provided with an electrical wire drawing path projecting toward outside and causing a plurality of at least one of the electrical wire bundle and the electrical wires to be drawn from inside to outside, the electrical wire drawing path includes a first wall member including two side portions extending in a projecting direction of the electrical wire drawing path, a second wall member disposed to be opposed to the first wall member with an interval, a first side wall member projecting from one side portion of the side portions of the first wall member in a direction crossing an extending direction of the side portion and toward the second wall member, and a second side wall member projecting from the other side portion of the side portions of the first wall member in a direction crossing an extending direction of the side portion and toward the second wall member, and at least one of the first side wall member and the second side wall member is formed as an elastically deformable member enabling change of volume of an electrical wire routing space surrounded by the first wall member, the second wall member, the first side wall member, and the second side wall member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an electrical connection box and a wire harness according to the present invention will now be described hereinafter with reference to drawings. The present invention is not limited to the embodiment.

Embodiment

An embodiment of an electrical connection box and a wire harness according to the present invention will now be described on the basis of FIG. 1 to FIG. 9.

Figure 1:
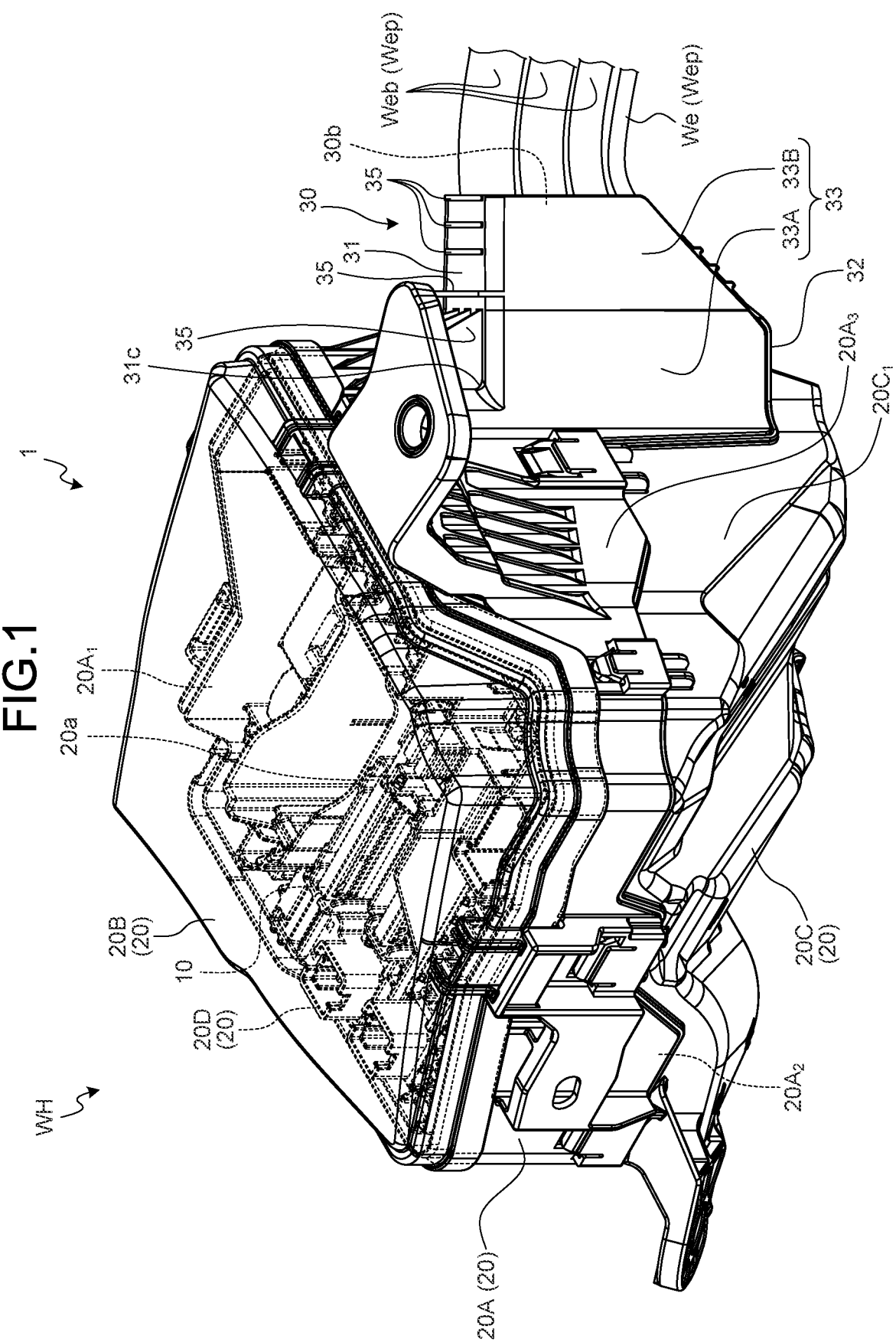
FIG. 1 is a perspective view illustrating an electrical connection box and a wire harness according to an embodiment.
Figure 2:
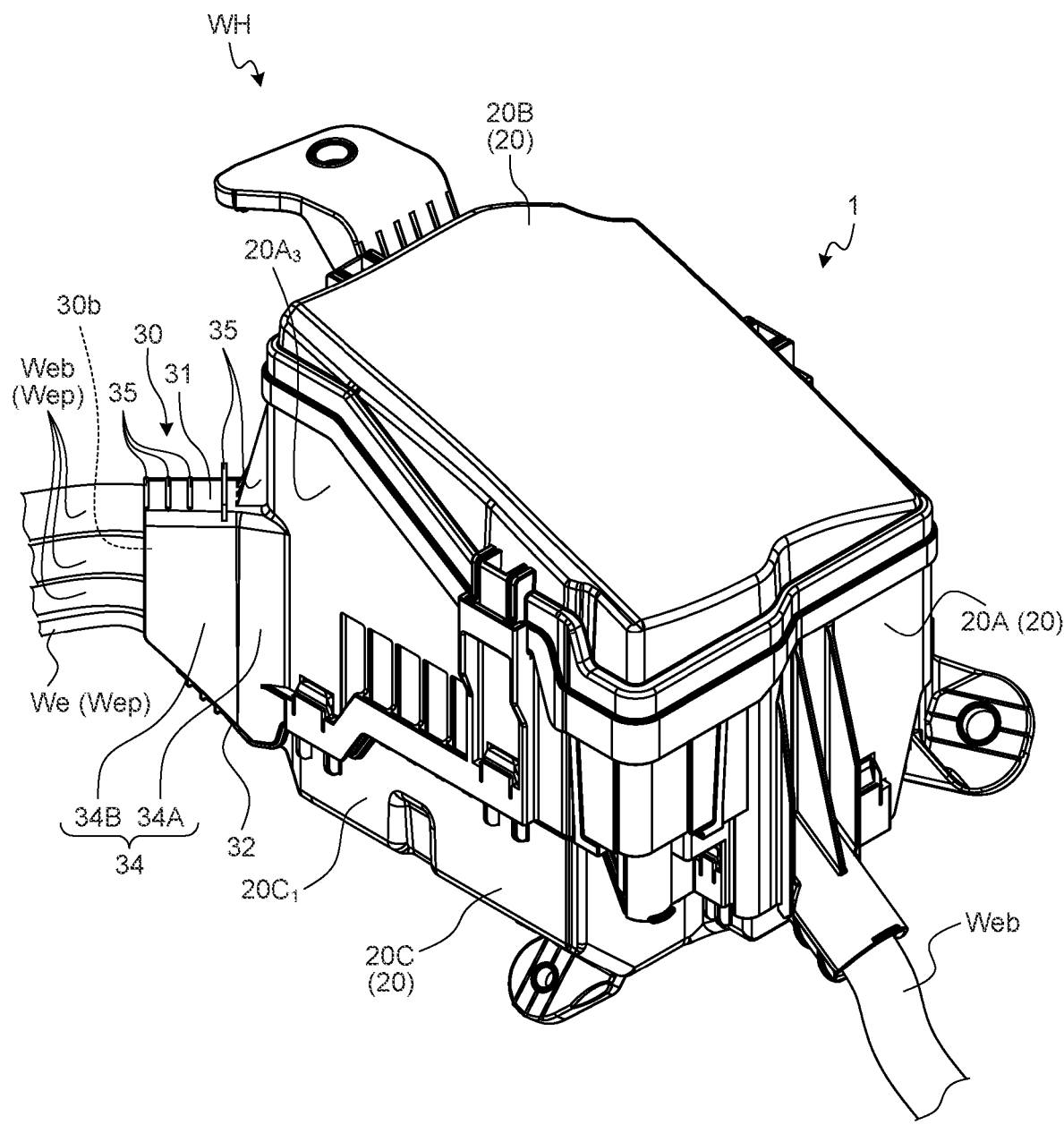
FIG. 2 is a perspective view of the electrical connection box and the wire harness according to the embodiment as viewed from another angle.

Reference sign 1 in FIG. 1 and FIG. 2 denotes an electrical connection box according to the present embodiment. Reference sign WH in FIG. 1 and FIG. 2 denotes a wire harness according to the present embodiment including the electrical connection box 1.

The electrical connection box 1 according to the present embodiment includes an electronic component 10 with which electrical wires We are electrically connected (FIG. 1). The electrical connection box 1 also includes an insulating housing 20 (FIG. 1 and FIG. 2). The electronic component 10 is stored inside the housing 20. In the housing 20, at least electrical wire bundles Web, each of which is formed of bundled electrical wires We, or electrical wires We are routed inside, and a plurality of at least the electrical wire bundles Web or the electrical wires We are drawn out from inside to outside the housing 20 (FIG. 1 and FIG. 2). The electrical connection box 1 forms the wire harness WH together with at least the electrical wire bundles Web or the electrical wires We drawn to the outside.

The electronic component 10 indicates, for example, a circuit protection component, such as a fuse and a fusible link, a relay, or a connector. In the present embodiment, an electronic device, such as a circuit board and an electronic control unit (ECU), is also regarded as a form of the electronic component 10.

The housing 20 is formed of an insulating material, such as synthetic resin. The housing 20 includes a storing chamber 20a in which the electronic component 10 is stored (FIG. 1). The housing 20 may be a storage box formed by assembling a plurality of individually formed, divided housings with each other, or may be a storage box formed as one box. The housing 20 illustrated herein is formed of three divided housings, and includes a frame 20A, an upper cover 20B, and a lower cover 20C (FIG. 1 and FIG. 2). The frame 20A is formed in a cylindrical shape with both ends open. In the housing 20, one opening $20A_1$ of the frame 20A is covered with the upper cover 20B, and the other opening 20A2 of the frame 20A is covered with the lower cover 20C (FIG. 1).

In addition, the housing 20 illustrated herein includes at least one storing member 20D detachably stored inside the frame 20A (FIG. 1). The storing member 20D is a block storing therein the electronic component 10 and the like and having the electronic component 10 be electrically connected with the electrical wires We therein. For this reason, in this illustration, the storing chamber 20a is formed in the storing member 20D. The storing member 20D in the illustration is inserted into the other opening $20A_2$ of the frame 20A and mounted inside the frame 20A via a locking mechanism or the like, in the state in which the electronic component 10 and the like are stored in the storing member 20D and the electrical wires We are electrically connected with the electronic component 10.

In the frame 20A, because a plurality of electrical wires We are electrically connected with one or a plurality of electronic components 10 inside the mounted storing member 20D or a plurality of such storing members 20D are mounted in the frame 20A, a plurality of electrical wires We are drawn out from inside to outside the storing member 20D. In addition, in the frame 20A, the electrical wires We drawn out from the storing member 20D to the outside are drawn out from the other opening 20A2 on the lower cover 20C side to the outside. The lower cover 20C is mounted on the frame 20A such that the electrical wires We are drawn to the outside of the housing 20. The electrical wires We drawn out from the frame 20A to the outside may all have, for example, a cylindrical shape with a same diameter, or may include a plurality of types of cylindrical electrical wires with different diameters.

In the frame 20A, there are cases where the lower cover 20C is mounted in the state in which all the electrical wires We drawn out from the other opening 20A2 to the outside are maintained in a single state. In addition, in the frame 20A, there are cases where the lower cover 20C is mounted in the state in which all the electrical wires We drawn out from the other opening $20A_2$ to the outside are divided into some groups each including a plurality of the electrical wires We, and the divided electrical wires We in each of the groups are bundled with a tape or a sheathing member (such as a corrugate tube) to form a plurality of electrical wire bundles Web for the respective groups. In the frame 20A, there are also cases where the lower cover 20C is mounted in the state in which one or a plurality of electrical wire bundles Web are formed from part of the electrical wires We drawn out from the other opening $20A_2$ to the outside and at least one electrical wire We maintained in a single state and at least one electrical wire bundle Web exist together in a mixed state. Accordingly, in the housing 20, there are cases where all the electrical wires We drawn out from the frame 20A to the outside are drawn to the outside in a single state, cases where only a plurality of electrical wire bundles Web for the respective groups drawn out from the frame 20A to the outside are drawn to the outside, and cases where at least one electrical wire We and at least one electrical wire bundles Web drawn from the frame 20A to the outside are drawn to the outside. In each of the electrical wire bundles Web, a plurality of electrical wires We are bundled to form a cylindrical shape.

For this reason, the housing 20 is provided with an electrical wire drawing path 30 projecting to the outside thereof and causing a plurality of at least the electrical wire bundles Web or the electrical wires We to be drawn from the inside to the outside thereof (FIG. 1 to FIG. 5). In the following explanation, a plurality of at least the electrical wire bundles Web or the electrical wires We routed in an electrical wire routing space 30a of the electrical wire drawing path 30 and drawn out from the electrical wire routing space 30a to the outside are referred to as "drawn electrical wires Wep", as necessary.

The electrical wire drawing path 30 includes a first wall member 31 including two side portions 31a and 31b extending in a projecting direction thereof, a second wall member 32 disposed to be opposed to the first wall member 31 with a space therebetween, a first side wall member 33 projecting from one side portion 31a of the first wall member 31 in a direction crossing a direction in which the one side portion 31a extends and toward the second wall member 32 side, and a second side wall member 34 projecting from the other side portion 31b of the first wall member 31 in a direction crossing a direction in which the other side portion 31b extends and toward the second wall member 32 side (FIG. 1 to FIG. 5).

Figure 3:
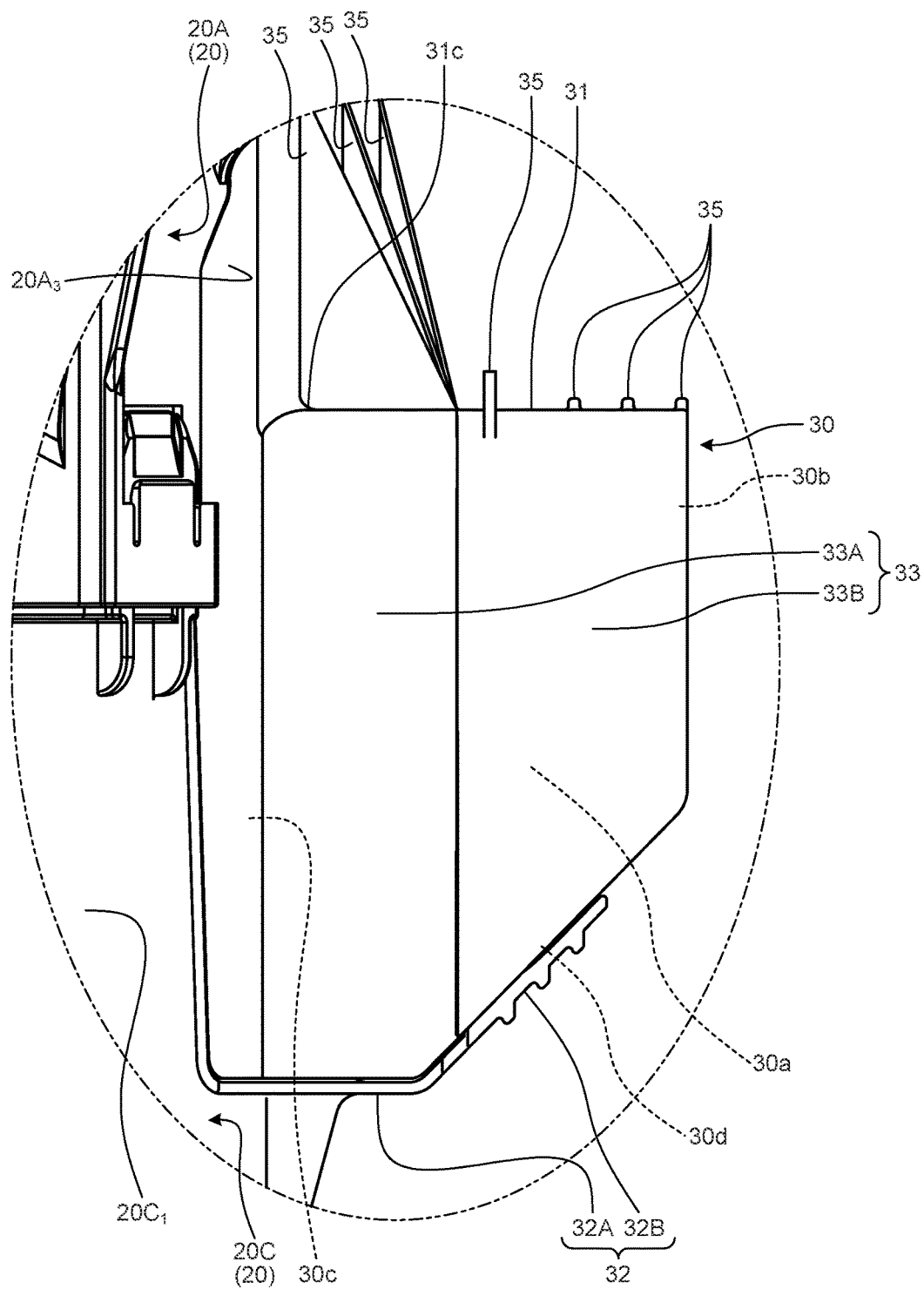
FIG. 3 is a plan view of an electrical wire drawing path of a housing as viewed from a side wall member side.

In the electrical wire drawing path 30, a space surrounded by the first wall member 31, the second wall member 32, the first side wall member 33, and the second side wall member 34 serves as the electrical wire routing space 30a in which the drawn electrical wires Wep are drawn from the inside of the housing 20. The electrical wire drawing path 30 has an opening surrounded by end portions of the first wall member 31, the second wall member 32, the first side wall member 33, and the second side wall member 34 on the projecting direction side thereof. The opening of the electrical wire drawing path 30 serves as an electrical wire drawing port 30b causing a plurality of drawn electrical wires Wep to be drawn out from the electrical wire routing space 30a to the outside (FIG. 1 to FIG. 4). Specifically, the electrical wire drawing path 30 includes the electrical wire drawing port 30b causing a plurality of drawn electrical wires Wep in the electrical wire routing space 30a to be drawn to the outside, in the end portion on the projecting direction side thereof. By contrast, in the electrical wire drawing path 30, an opening surrounded by end portions of the first wall member 31, the second wall member 32, the first side wall member 33, and the second side wall member 34 on a side opposite to the projecting direction thereof is formed, and the opening serves as an electrical wire entrance port 30c to draw drawn electrical wires Wep drawn out from the frame 20A to the outside into the electrical wire routing space 30a (FIG. 3). In each of the first wall member 31, the second wall member 32, the first side wall member 33, and the second side wall member 34, a wall surface positioned on the electrical wire routing space 30a side serves as an inner wall surface, and a wall surface positioned on a side opposite to the electrical wire routing space 30a side serves as an outer wall surface.

Figure 5:
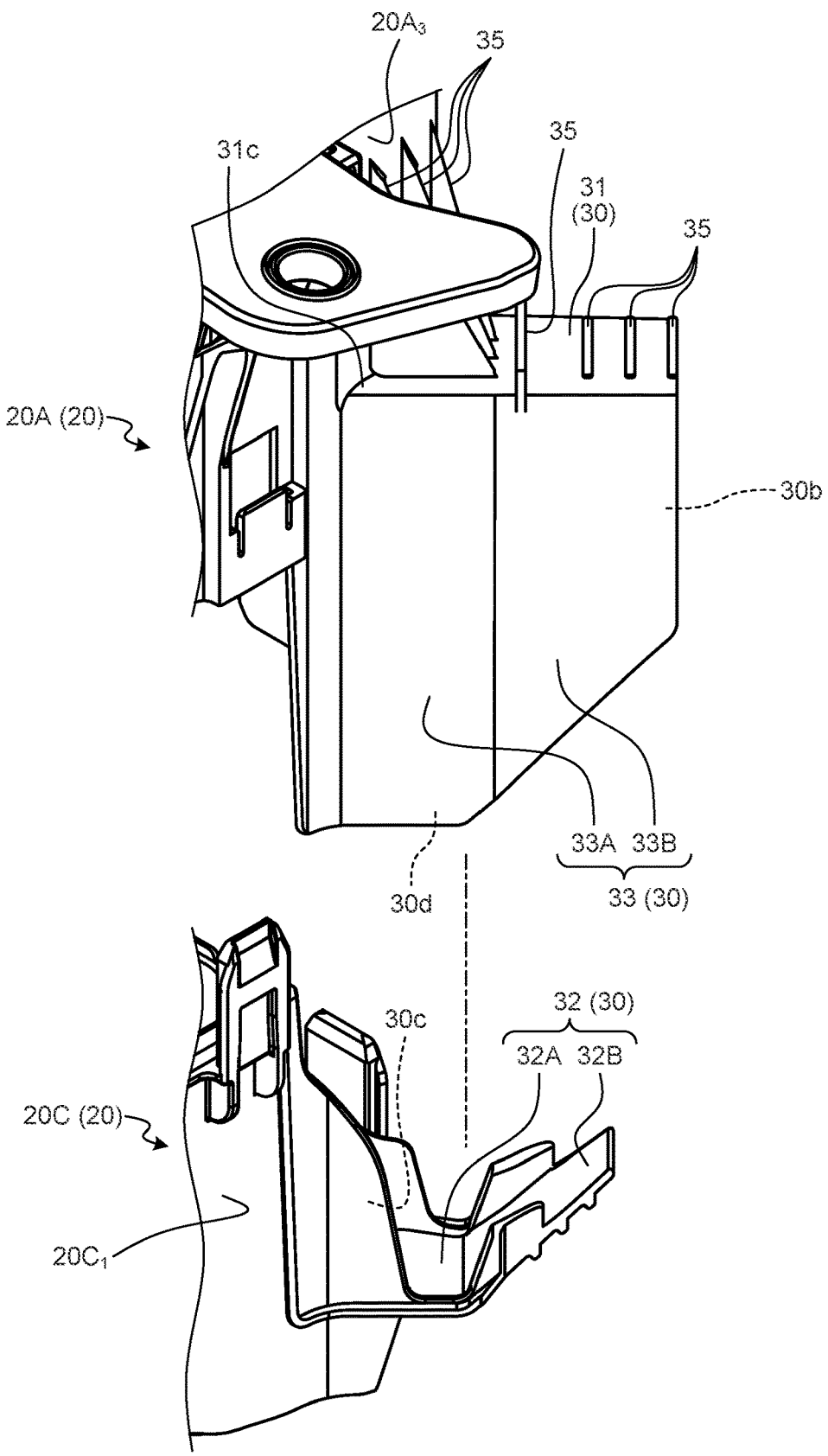
FIG. 5 is an exploded perspective view of the electrical wire drawing path.

In the electrical wire drawing path 30 illustrated herein, the first wall member 31, the first side wall member 33, and the second side wall member 34 are formed as one unitary piece with the frame 20A, and the second wall member 32 is formed as one unitary piece with the lower cover 20c (FIG. 5).

The first wall member 31 is formed to project from an outer wall surface $20A_3$ of the frame 20A in a projecting direction of the electrical wire drawing path 30 (FIG. 1 to FIG. 3 and FIG. 5). The first wall member 31 in the illustration is formed in a rectangular flat plate shape, and one side portion 31c is connected with the outer wall surface $20A_3$ of the frame 20A (FIG. 1 and FIG. 3). The two side portions 31a and 31b are portions connected with the side portion 31c on the outer wall surface $20A_3$ side of the frame 20A, and project from the outer wall surface $20A_3$. The electrical wire drawing path 30 includes reinforcing portions 35, such as ribs, on the outer wall surface of the first wall member 31 to suppress elastic deformation of the first wall member 31 (FIG. 1 to FIG. 5).

The first side wall member 33 is formed to project from the one side portion 31a of the first wall member 31 in the direction crossing the extending direction of the one side portion 31a and toward the second wall member 32 side, and project from the outer wall surface $20A_3$ of the frame 20A in the projecting direction of the electrical wire drawing path 30. Specifically, the first side wall member 33 is connected with the one side portion 31a of the first wall member 31 and the outer wall surface $20A_3$ of the frame 20A.

By contrast, the second side wall member 34 is formed to project from the other side portion 31b of the first wall member 31 in the direction crossing the extending direction of the other side portion 31b and toward the second wall member 32 side, and project from the outer wall surface $20A_3$ of the frame 20A in the projecting direction of the electrical wire drawing path 30. Specifically, the second side wall member 34 is connected with the other side portion 31b of the first wall member 31 and the outer wall surface $20A_3$ of the frame 20A.

Figure 4:
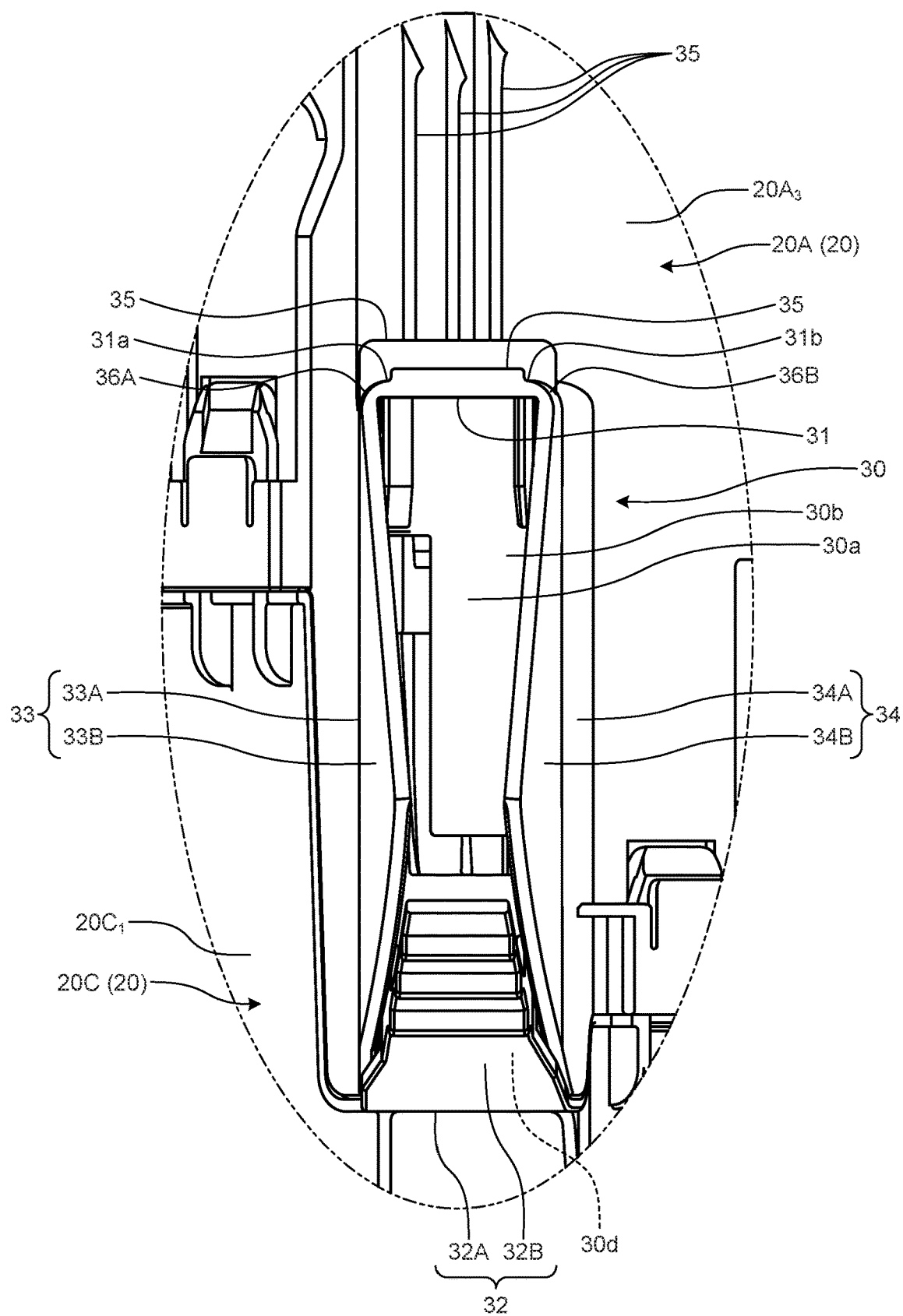
FIG. 4 is a plan view of the electrical wire drawing path of the housing as viewed from an electrical wire drawing port side.

In the frame 20A in the illustration, an opening surrounded by end portions of the first wall member 31, the first side wall member 33, and the second side wall member 34 on the side in the projecting direction of the electrical wire drawing path 30 forms a main shape of the electrical wire drawing port 30b. In addition, in the frame 20A in the illustration, an opening 30d is also formed between an end portion of the first side wall member 33 on a side in a projecting direction from the one side portion 31a of the first wall member 31 and an end portion of the second side wall member 34 on a side in a projecting direction from the other side portion 31b of the first wall member 31 (FIG. 3 to FIG. 5).

The second wall member 32 covers the whole or part of the opening 30d. The second wall member 32 in the illustration is formed to project from an outer wall surface $20C_1$ of the lower cover 20C (FIG. 1 to FIG. 3 and FIG. 5). The second wall member 32 covers the whole or part of the opening 30d by mounting the lower cover 20C on the frame 20A.

In the electrical wire drawing path 30 in the illustration, the first side wall member 33 and the second side wall member 34 are formed as members having an equal flat plate shape. At least one of the first side wall member 33 and the second side wall member 34 is formed as an elastically deformable member enabling change of the volume of the electrical wire routing space 30a. For example, at least one of the first side wall member 33 and the second side wall member 34 is formed as a member having a thickness enabling elastic deformation in a direction crossing the wall surface thereof.

Figure 6:
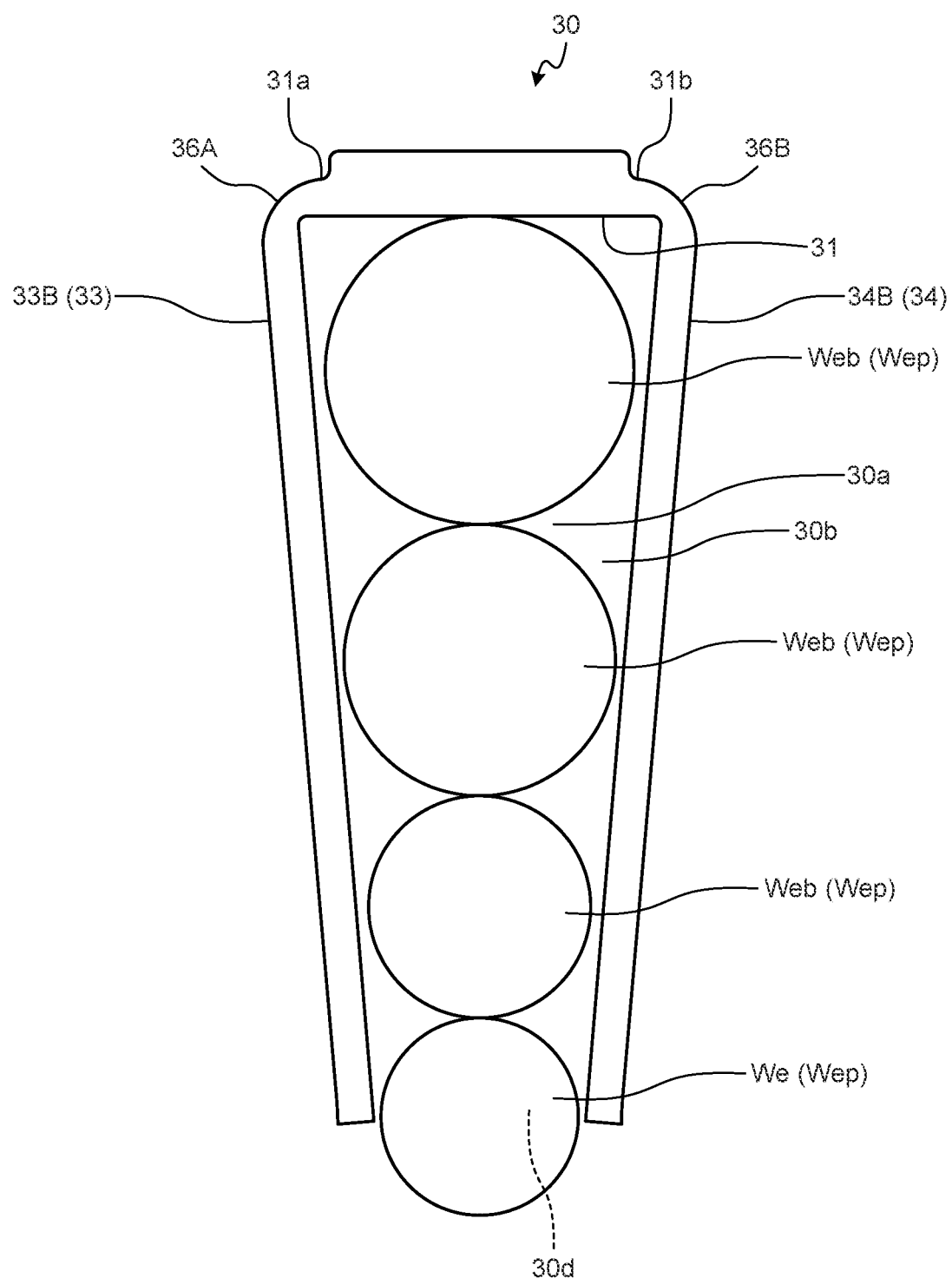
FIG. 6 is a diagram illustrating an example of a shape of an electrical wire drawing port corresponding to drawn electrical wires.
Figure 7:
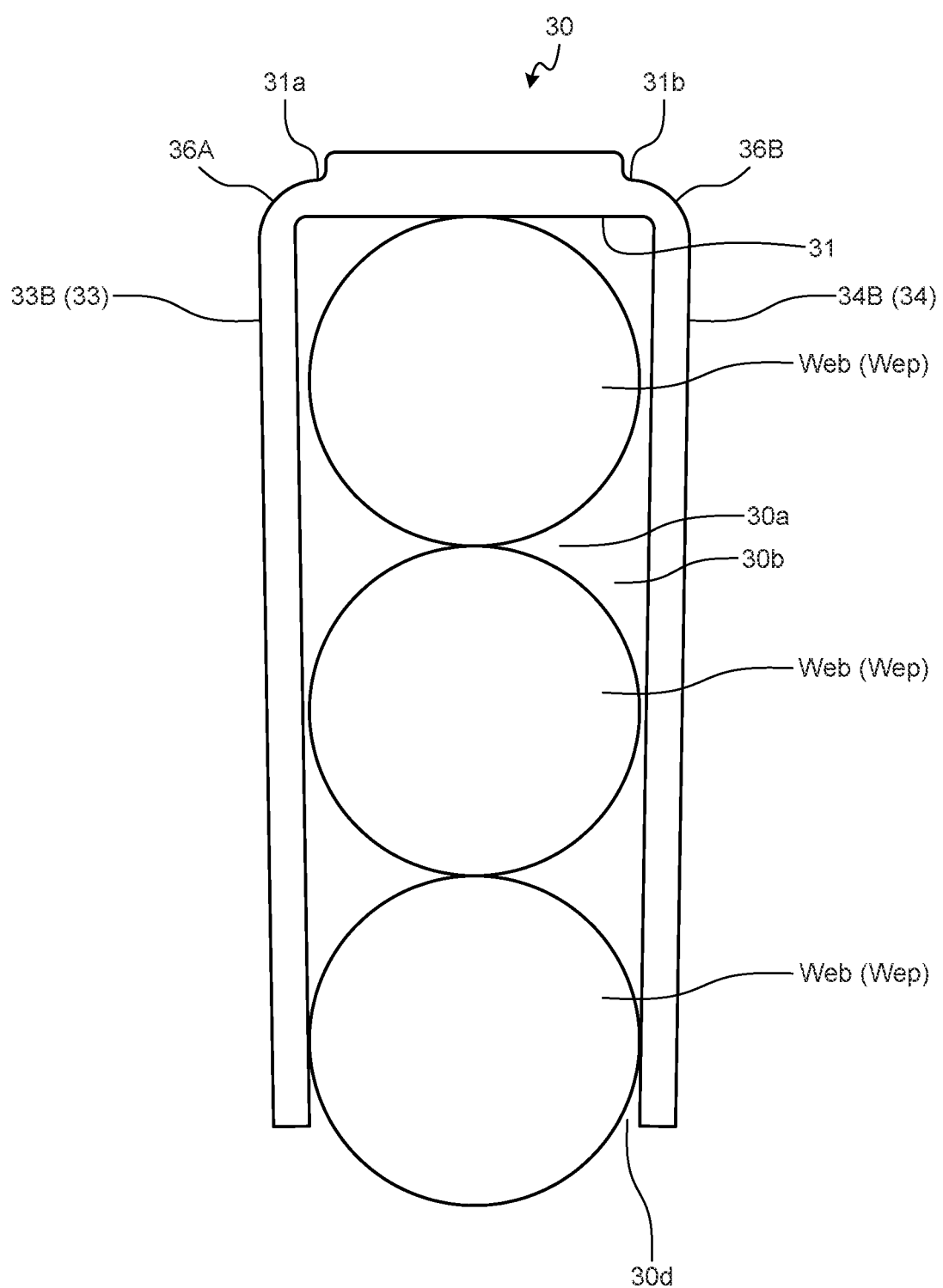
FIG. 7 is a diagram illustrating an example of the shape of the electrical wire drawing port corresponding to drawn electrical wires.
Figure 8:
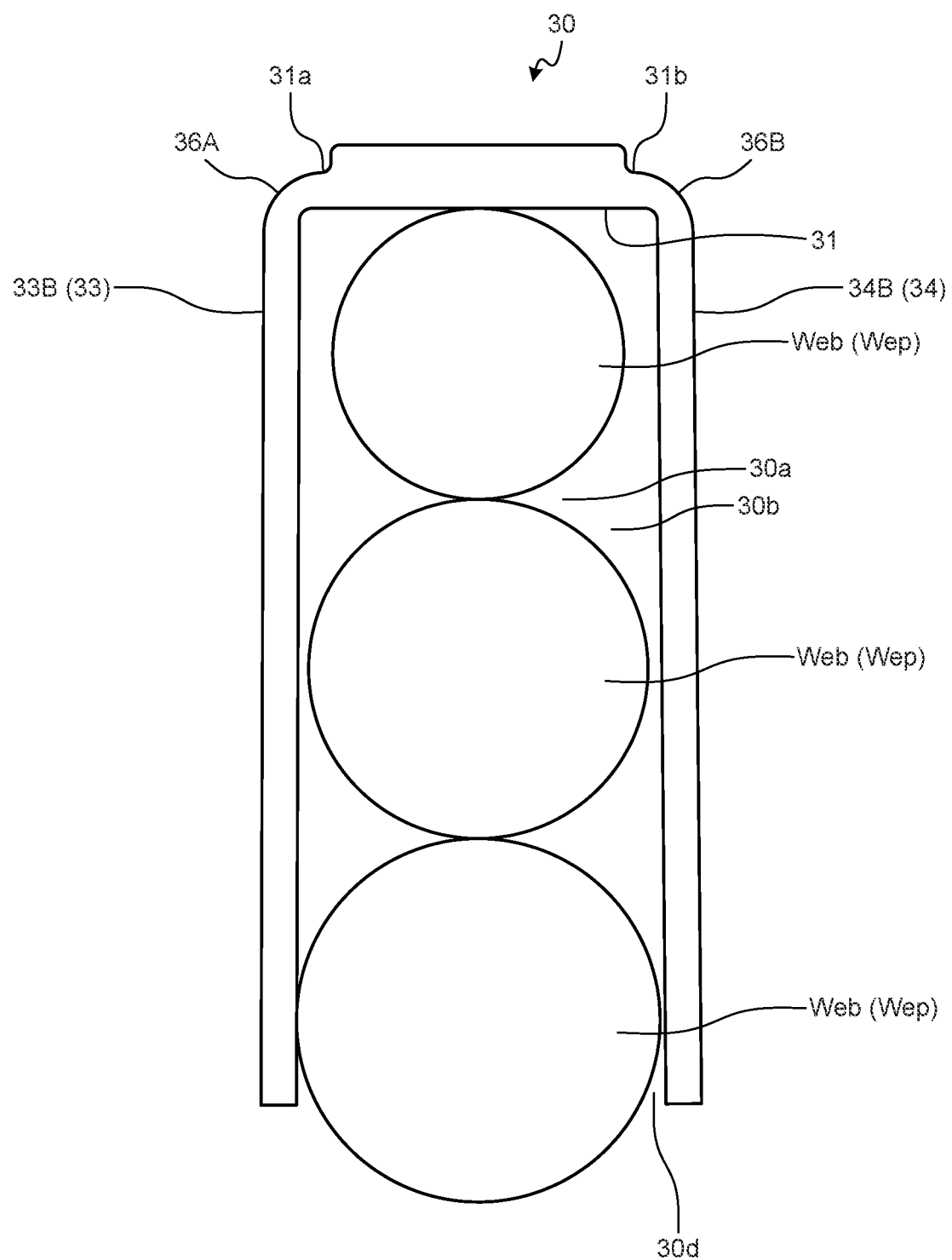
FIG. 8 is a diagram illustrating an example of the shape of the electrical wire drawing port corresponding to drawn electrical wires.

With this structure, the electrical wire drawing path 30 is enabled to route a plurality of drawn electrical wires Wep such that the gap of the electrical wire drawing port 30b is set to a gap (standard gap) of a predetermined size, without changing the shape thereof (FIG. 6). FIG. 6 illustrates the shape of the electrical wire drawing port 30b in the case of drawing three electrical wire bundles Web having different diameters in which the electrical wire bundle Web located on the first wall member 31 side has the largest diameter, and one electrical wire We. In the electrical wire drawing path 30, when electrical wires of different size and/or different number from those of the electrical wires Wep are routed in the electrical wire routing space 30a, at least one of the first side wall member 33 and the second side wall member 34 is elastically deformed to follow the drawn electrical wires Wep. This structure enables routing of a plurality of drawn electrical wires Wep such that the gap of the electrical wire drawing port 30b is set to the standard gap (FIG. 7 and FIG. 8). FIG. 7 illustrates the shape of the electrical wire drawing port 30b in the case of drawing three electrical wire bundles Web having the same diameter. By contrast, FIG. 8 illustrates the shape of the electrical wire drawing port 30b in the case of drawing three electrical wire bundles Web having different diameters, in which the electrical wire bundle Web located on the first wall member 31 side has the smallest diameter. The standard gap indicates a gap of the electrical wire drawing port 30b having a size capable of suppressing entering of water from the outside.

Specifically, in the electrical wire drawing path 30 in the illustration, both the first side wall member 33 and the second side wall member 34 are formed as elastically deformable members capable of changing the volume of the electrical wire routing space 30a.

The first side wall member 33 of the illustration includes a main member 33A formed in a rectangular flat plate shape, and a variable member 33B formed in a trapezoidal flat plate shape (FIG. 1 to FIG. 5). The main member 33A includes one side portion connected with the one side portion 31a of the first wall member 31, and another side portion connected with the outer wall surface $20A_3$ of the frame 20A. The variable member 33B is formed in a trapezoidal flat plate shape including a side on the electrical wire drawing port 30b side serving as the upper base and a side on the electrical wire entrance port 30c side serving as the lower base. The variable member 33B includes a side portion running along the height direction, and the side portion is connected with the one side portion 31a of the first wall member 31. The variable member 33B includes a side portion on the lower base side connected with a side portion of the main member 33A on the electrical wire drawing port 30b side. In the first side wall member 33 illustrated herein, at least the variable member 33B is formed as an elastically deformable member capable of changing the volume of the electrical wire routing space 30a. In this example, both the main member 33A and the variable member 33B are formed as such elastically deformable members.

In addition, the second side wall member 34 of the illustration includes a main member 34A formed in a rectangular flat plate shape, and a variable member 34B formed in a trapezoidal flat plate shape (FIG. 2 and FIG. 4). The main member 34A includes one side portion connected with the other side portion 31b of the first wall member 31, and another side portion connected with the outer wall surface $20A_3$ of the frame 20A. The variable member 34B is formed in a trapezoidal flat plate shape including a side on the electrical wire drawing port 30b side serving as the upper base and a side on the electrical wire entrance port 30c side serving as the lower base. The variable member 34B includes a side portion running along the height direction, and the side portion is connected with the other side portion 31b of the first wall member 31. The variable member 34B includes a side portion on the lower base side connected with a side portion of the main member 34A on the electrical wire drawing port 30b side. In the second side wall member 34 illustrated herein, at least the variable member 34B is formed as an elastically deformable member capable of changing the volume of the electrical wire routing space 30a. In this example, both the main member 34A and the variable member 34B are formed as such elastically deformable members.

In the electrical wire drawing path 30 in the illustration, an opening surrounded by end portions of the first wall member 31, the main member 33A of the first side wall member 33, and the main member 34A of the second side wall member 34 on a side opposite to the projecting direction thereof has a rectangular shape. Specifically, in the electrical wire drawing path 30, the electrical wire entrance port 30c is formed as a rectangular opening. In the electrical wire routing space 30a, a space surrounded by the first wall member 31, the main member 33A of the first side wall member 33, and the main member 34A of the second side wall member 34 may have a square shape in which the rectangular shape of the electrical wire entrance port 30c extends to the end portion (boundary portion of the space surrounded by the first wall member 31, the variable member 33B of the first side wall member 33, and the variable member 34B of the second side wall member 34) on the electrical wire drawing port 30b side, or may have a frustum shape in which the rectangular shape of the electrical wire entrance port 30c is gradually reduced to the end portion on the electrical wire drawing port 30b side.

By contrast, in the electrical wire drawing path 30 in the illustration, the variable member 33B of the first side wall member 33 is formed in a shape in which the side portion on the electrical wire drawing port 30b side (upper base side) is brought close to the side portion of the variable member 34B of the second side wall member 34 on the electrical wire drawing port 30b side (upper base side), as it extends toward the opening 30d side (FIG. 4). With this structure, the variable member 33B of the first side wall member 33 in the illustration is formed in a shape in which the side portion on the opening 30d side is brought close to the side portion of the variable member 34B of the second side wall member 34 on the opening 30d side, as it extends toward the electrical wire drawing port 30b side (FIG. 4). Accordingly, the variable member 33B of the first side wall member 33 of the illustration is formed in a state in which the wall surface is bent such that an intersection point of the side portion on the electrical wire drawing port 30b side (upper base side) and the side portion on the opening 30d side is brought closest to the variable member 34B side of the second side wall member 34. In addition, the variable member 34B of the second side wall member 34 is formed in a shape in which the side portion on the electrical wire drawing port 30b side (upper base side) is brought close to the side portion of the variable member 33B of the first side wall member 33 on the electrical wire drawing port 30b side (upper base side), as it extends toward the opening 30d side (FIG. 4). With this structure, the variable member 34B of the second side wall member 34 in the illustration is formed in a shape in which the side portion on the opening 30d side is brought close to the side portion of the variable member 33B of the first side wall member 33 on the opening 30d side, as it extends toward the electrical wire drawing port 30b side (FIG. 4). Accordingly, the variable member 34B of the second side wall member 34 of the illustration is formed in a state in which the wall surface is bent such that an intersection point of the side portion on the electrical wire drawing port 30b side (upper base side) and the side portion on the opening 30d side is brought closest to the variable member 33B side of the first side wall member 33.

As described above, the electrical wire drawing path 30 illustrated herein is formed with a structure in which the interval between end portions (end portions on the opening 30d side) of the first side wall member 33 and the second side wall member 34 in the projecting direction is smaller than the interval between the two side portions 31a and 31b in the first wall member 31, at the electrical wire drawing port 30b. In the electrical wire drawing path 30 in the illustration, with the bent shapes of the variable member 33B of the first side wall member 33 and the variable member 34B of the second side wall member 34 as described above, the electrical wire drawing port 30b has a trapezoidal shape with a portion on the opening 30d side serving as the upper base and a portion on the first wall member 31 side serving as the lower base.

In the electrical wire drawing path 30, a boundary portion between the one side portion 31a of the first wall member 31 and the first side wall member 33 is preferably provided with an elastically deformable portion 36A enabling tilt of the first side wall member 33 with respect to the first wall member 31 (FIG. 4). The elastically deformable portion 36A may be provided regardless of whether to provide the first side wall member 33 with flexibility. For example, when the first side wall member 33 has no flexibility, the elastically deformable portion 36A is capable of changing the volume of the electrical wire routing space 30a together with elastic deformation of the second side wall member 34, by tilting the first side wall member 33 with the portion of the first wall member 31 on the one side portion 31a side serving as the starting point. By contrast, when the first side wall member 33 has flexibility, the elastically deformable portion 36A is capable of tilting at least the first side wall member 33 while elastically deforming the first side wall member 33. As described above, the elastically deformable portion 36A enables increase in deformation quantity of the volume of the electrical wire routing space 30a, in comparison with a structure without the elastically deformable portion 36A. For example, the elastically deformable portion 36A is formed to be elastically deformable and to have a thickness smaller than the thickness of the first wall member 31 and the first side wall member 33. In addition, the elastically deformable portion 36A is preferably provided in a portion connected with at least the variable member 33B, in a boundary portion between the one side portion 31a of the first wall member 31 and the first side wall member 33.

In addition, in the electrical wire drawing path 30, a boundary portion between the other side portion 31b of the first wall member 31 and the second side wall member 34 is preferably provided with an elastically deformable portion 36B enabling tilt of the second side wall member 34 with respect to the first wall member 31 (FIG. 4). The elastically deformable portion 36B may be provided regardless of whether to provide the second side wall member 34 with flexibility. For example, when the second side wall member 34 has no flexibility, the elastically deformable portion 36B is capable of changing the volume of the electrical wire routing space 30a together with elastic deformation of the first side wall member 33, by tilting the second side wall member 34 with the portion of the first wall member 31 on the other side portion 31b side serving as the starting point. By contrast, when the second side wall member 34 has flexibility, the elastically deformable portion 36B is capable of tilting at least the second side wall member 34 while elastically deforming the second side wall member 34. As described above, the elastically deformable portion 36B enables increase in deformation quantity of the volume of the electrical wire routing space 30a, in comparison with a structure without the elastically deformable portion 36B. For example, the elastically deformable portion 36B is formed to be elastically deformable and have a thickness smaller than the thickness of the first wall member 31 and the second side wall member 34. In addition, the elastically deformable portion 36B is preferably provided in a portion connected with at least the variable member 34B, in a boundary portion between the other side portion 31b of the first wall member 31 and the second side wall member 34.

The electrical wire drawing path 30 in the illustration includes the two elastically deformable portions 36A and 36B. With this structure, the electrical wire drawing path 30 in the illustration enables tilt of the first side wall member 33 and the second side wall member 34 with the respective elastically deformable portions 36A and 36B while elastically deforming both of the first side wall member 33 and the second side wall member 34. Accordingly, the electrical wire drawing path 30 in the illustration enables increase in deformation quantity of the volume of the electrical wire routing space 30a to the maximum.

The second wall member 32 in the illustration includes a first piece member 32A and a second piece member 32B each having a rectangular flat plate shape (FIG. 3 to FIG. 5). The first piece member 32A is a portion covering a part of the opening 30d formed with the main member 33A of the first side wall member 33 and the main member 34A of the second side wall member 34. The second piece member 32B is a portion covering a part of the opening 30d formed with the variable member 33B of the first side wall member 33 and the variable member 34B of the second side wall member 34, and connected with the first piece member 32A on the electrical wire drawing port 30b side. The second piece member 32B may be formed as a tiltable member to enable change of the volume of the electrical wire routing space 30a. For example, in the second wall member 32, a boundary portion between the first piece member 32A and the second piece member 32B may be provided with an elastically deformable portion enabling tilt of the second piece member 32B with respect to the first piece member 32A. The elastically deformable portion is formed to be elastically deformable and to have a thickness smaller than the thickness of each of the first piece member 32A and the second piece member 32B. The electrical wire drawing path 30 in this case enables further increase in deformation quantity of the volume of the electrical wire routing space 30a.

As described above, the electrical connection box 1 according to the present embodiment enables change in volume of the electrical wire routing space 30a of the electrical wire drawing path 30 included in the housing 20, and enables use of the common housing 20 compliant with various electrical wires We and/or electrical wire bundles Web having different sizes and/or numbers, for example, in vehicles having different specifications. For this reason, the electrical connection box 1 contributes to reduction in cost by application of the same housing 20 to various types of vehicles. In addition, the electrical connection box 1 according to the present embodiment enables change of the volume of the electrical wire routing space 30a, and enables adjustment of the gap of the electrical wire drawing port 30b to the standard gap or a size close to the standard gap. For this reason, the electrical connection box 1 enables securement of waterproof property even in vehicles having different specifications. In the electrical connection box 1, waterproof property is improved by winding tape (not illustrated) around the outer wall surface of the electrical wire drawing path 30 and the drawn electrical wires Wep drawn out from the electrical wire drawing port 30b and covering the gap of the electrical wire drawing port 30b. The wire harness WH according to the present embodiment includes such an electrical connection box 1, and is capable of producing the effect obtained with the electrical connection box 1 in the same manner.

Figure 9:
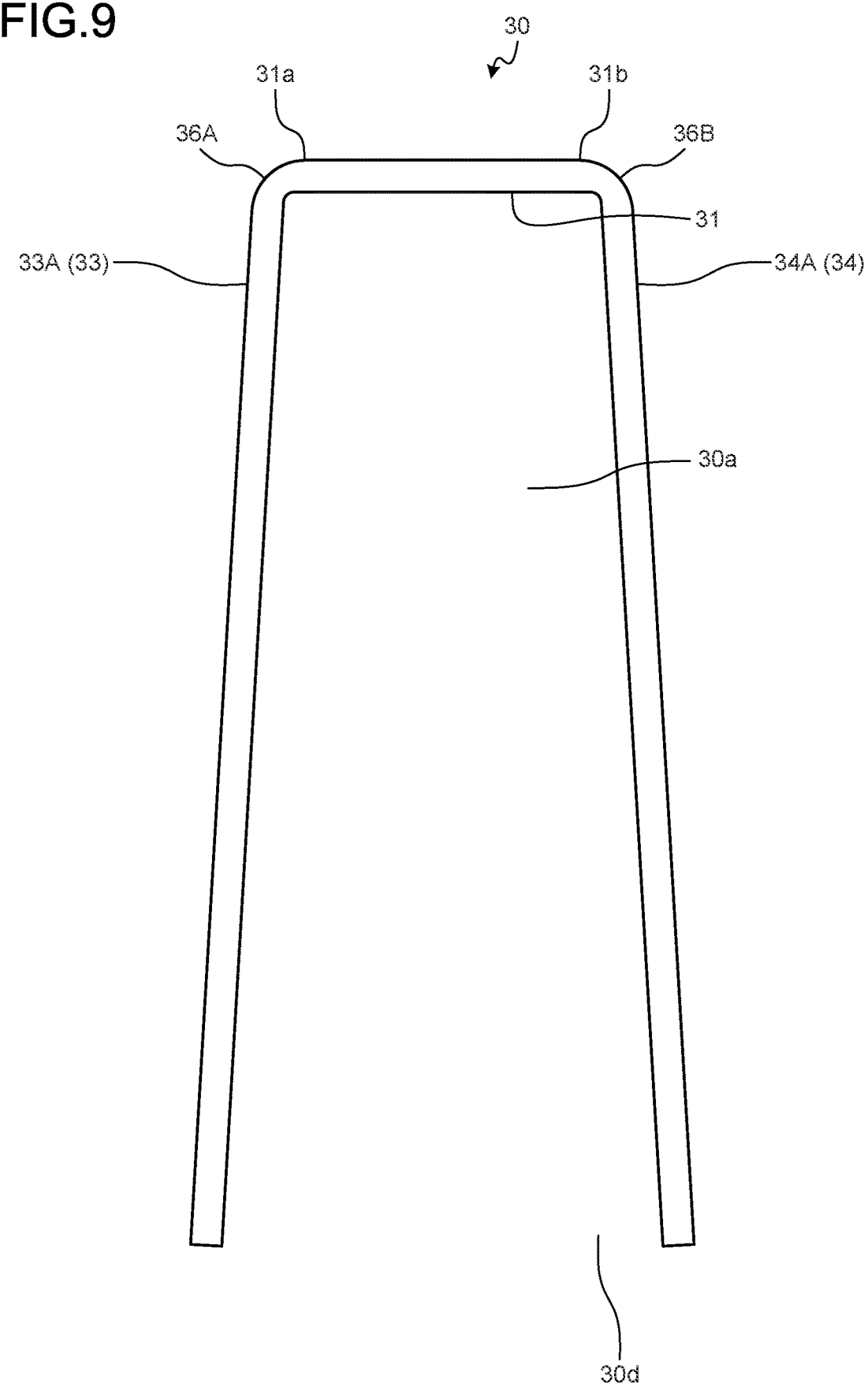
FIG. 9 is a diagram illustrating a changed form of the shape of a first side wall member and a second side wall member on a main member side in an electrical wire routing space.

In the structure, the main member 33A of the first side wall member 33 may be formed to project from the one side portion 31a of the first wall member 31 toward the second wall member 32 side, in a state of being tilted to the outer wall surface side opposite to the electrical wire routing space 30a side (FIG. 9). In addition, in the same manner, the main member 34A of the second side wall member 34 may be formed to project from the other side portion 31b of the first wall member 31 toward the second wall member 32 side, in a state of being tilted to the outer wall surface side opposite to the electrical wire routing space 30a side (FIG. 9). Specifically, the electrical wire drawing path 30 may be formed with a structure in which the electrical wire entrance port 30c is formed as an trapezoidal opening with a portion on the first wall member 31 side serving as the upper base and a portion on the opening 30d side serving as the lower base, and a cross section orthogonal to the projecting direction of the electrical wire drawing path 30 in the space surrounded by the first wall member 31, the main member 33A of the first side wall member 33, and the main member 34A of the second side wall member 34 is maintained at the shape of the trapezoidal electrical wire entrance port 30c.

With this structure, the electrical wire drawing path 30 enables drawing of drawn electrical wires Wep having a larger size through the electrical wire entrance port 30c into the electrical wire routing space 30a, in comparison with the structure in which the space surrounded by the first wall member 31, the main member 33A of the first side wall member 33, and the main member 34A of the second side wall member 34 has the square shape illustrated above or the like. In addition, in the electrical wire drawing path 30, the interval between end portions (that is, end portions thereof on the opening 30d side) of the variable member 33B of the first side wall member 33 and the variable member 34B of the second side wall member 34 in the projecting direction thereof can be increased to be larger than the interval between the two side portions 31a and 31b in the first wall member 31, by elastically deforming at least one of the first side wall member 33 and the second side wall member 34. This structure enables drawing of drawn electrical wires Wep having a larger size that are drawn from the electrical wire entrance port 30c into the electrical wire routing space 30a out of the electrical wire drawing port 30b.

The electrical connection box according to the present embodiment enables change in volume of the electrical wire routing space of the electrical wire drawing path included in the housing by elastically deforming at least one of the first side wall member and the second side wall member, and enables use of the common housing compliant with various electrical wires and/or electrical wire bundles having different sizes and/or numbers, for example, in vehicles having different specifications. In addition, the wire harness according to the present embodiment includes such an electrical connection box, and is capable of producing the effect obtained with the electrical connection box in the same manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electrical connection box comprising:
an electronic component with which an electrical wire is electrically connected; and
an insulating housing storing therein the electronic component and in which at least one of an electrical wire bundle and the electrical wire is routed therein, the electrical wire bundle being formed by bundling a plurality of the electrical wires, wherein
the housing is provided with an electrical wire drawing path projecting toward outside and causing a plurality of at least one of the electrical wire bundle and the electrical wire to be drawn from inside to outside,
the electrical wire drawing path includes a first wall member including two side portions extending in a projecting direction of the electrical wire drawing path, a second wall member disposed to be opposed to the first wall member with an interval, a first side wall member projecting from one side portion of the side portions of the first wall member in a direction crossing an extending direction of the side portion and toward the second wall member, and a second side wall member projecting from the other side portion of the side portions of the first wall member in a direction crossing an extending direction of the side portion and toward the second wall member, and at least one of the first side wall member and the second side wall member is formed as an elastically deformable member enabling change of volume of an electrical wire routing space surrounded by the first wall member, the second wall member, the first side wall member, and the second side wall member.

2. The electrical connection box according to claim 1, wherein
a boundary portion between the one side portion of the first wall member and the first side wall member is provided with an elastically deformable portion enabling tilt of the first side wall member with respect to the first wall member.

3. The electrical connection box according to claim 1, wherein
a boundary portion between the other side portion of the first wall member and the second side wall member is provided with an elastically deformable portion enabling tilt of the second side wall member with respect to the first wall member.

4. The electrical connection box according to claim 2, wherein
a boundary portion between the other side portion of the first wall member and the second side wall member is provided with an elastically deformable portion enabling tilt of the second side wall member with respect to the first wall member.

5. The electrical connection box according to claim 1, wherein
an end portion of the electrical wire drawing path on a projecting direction side is provided with an electrical wire drawing port causing a plurality of at least one of the electrical wire bundle and the electrical wire in the electrical wire routing space to be drawn to the outside, and
the electrical wire drawing path is formed such that an interval between an end portion of the first side wall member in a projecting direction thereof and an end portion of the second side wall member in a projecting direction thereof is smaller than an interval between the two side portions of the first wall member, at the electrical wire drawing port.

6. The electrical connection box according to claim 2, wherein
an end portion of the electrical wire drawing path on a projecting direction side is provided with an electrical wire drawing port causing a plurality of at least one of the electrical wire bundle and the electrical wire in the electrical wire routing space to be drawn to the outside, and
the electrical wire drawing path is formed such that an interval between an end portion of the first side wall member in a projecting direction thereof and an end portion of the second side wall member in a projecting direction thereof is smaller than an interval between the two side portions of the first wall member, at the electrical wire drawing port.

7. The electrical connection box according to claim 3, wherein
an end portion of the electrical wire drawing path on a projecting direction side is provided with an electrical wire drawing port causing a plurality of at least one of the electrical wire bundle and the electrical wire in the electrical wire routing space to be drawn to the outside, and
the electrical wire drawing path is formed such that an interval between an end portion of the first side wall member in a projecting direction thereof and an end portion of the second side wall member in a projecting direction thereof is smaller than an interval between the two side portions of the first wall member, at the electrical wire drawing port.

8. A wire harness comprising:
an electrical wire;
an electronic component with which an the electrical wires is electrically connected; and
an insulating housing storing therein the electronic component and in which at least one of an electrical wire bundle and the electrical wire is routed therein, the electrical wire bundle being formed by bundling a plurality of the electrical wires, wherein
the housing is provided with an electrical wire drawing path projecting toward outside and causing a plurality of at least one of the electrical wire bundle and the electrical wire to be drawn from inside to outside,
the electrical wire drawing path includes a first wall member including two side portions extending in a projecting direction of the electrical wire drawing path, a second wall member disposed to be opposed to the first wall member with an interval, a first side wall member projecting from one side portion of the side portions of the first wall member in a direction crossing an extending direction of the side portion and toward the second wall member, and a second side wall member projecting from the other side portion of the side portions of the first wall member in a direction crossing an extending direction of the side portion and toward the second wall member, and
at least one of the first side wall member and the second side wall member is formed as an elastically deformable member enabling change of volume of an electrical wire routing space surrounded by the first wall member, the second wall member, the first side wall member, and the second side wall member.

* * * * *